United States Patent
Xie et al.

(10) Patent No.: US 11,466,906 B2
(45) Date of Patent: Oct. 11, 2022

(54) ELECTROCALORIC HEAT TRANSFER SYSTEM

(71) Applicant: Carrier Corporation, Jupiter, FL (US)

(72) Inventors: Wei Xie, Malden, MA (US); Aritra Sur, Manchester, CT (US); Subramanyaravi Annapragada, Palm Beach Gardens, FL (US); William A. Rioux, Willington, CT (US); Joseph V. Mantese, Ellington, CT (US); Parmesh Verma, South Windsor, CT (US); Scott Alan Eastman, Glastonbury, CT (US); Thomas D. Radcliff, Vernon, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 198 days.

(21) Appl. No.: 16/765,004

(22) PCT Filed: Sep. 28, 2018

(86) PCT No.: PCT/US2018/053499
§ 371 (c)(1),
(2) Date: May 18, 2020

(87) PCT Pub. No.: WO2019/108299
PCT Pub. Date: Jun. 6, 2019

(65) Prior Publication Data
US 2020/0309421 A1    Oct. 1, 2020

Related U.S. Application Data

(60) Provisional application No. 62/592,837, filed on Nov. 30, 2017.

(51) Int. Cl.
*F25B 21/02* (2006.01)

(52) U.S. Cl.
CPC ........ *F25B 21/02* (2013.01); *F25B 2321/001* (2013.01)

(58) Field of Classification Search
CPC .................................. F25B 2321/001
See application file for complete search history.

(56) References Cited

U.S. PATENT DOCUMENTS 3,638,440 A * 2/1972 Lawless .................. F25B 21/00
                                                            62/3.1
5,644,184 A    7/1997 Kucherov
(Continued)

FOREIGN PATENT DOCUMENTS

JP      2015094552 A       5/2015
WO      2015156794 A1     10/2015
(Continued)

OTHER PUBLICATIONS

International Search Report for International Application No. PCT/US2018/053499; Application Filign Date Sep. 28, 2018; dated Jan. 17, 2019, 7 pages.
(Continued)

*Primary Examiner* — Ana M Vazquez
(74) *Attorney, Agent, or Firm* — Cantor Colburn LLP

(57) ABSTRACT

Disclosed is a heat transfer system with a module that includes a peripheral frame (10) and an electrocaloric element (46) disposed in an opening in the peripheral frame. The electrocaloric element includes an electrocaloric film (46), a first electrode (48) on a first side of the electrocaloric film, and a second electrode (50) on a second side of the electrocaloric film. First and second electrically conductive elements (24, 25) are disposed adjacent to first and second surfaces of the peripheral frame, and provide an electrical connection to the first and second electrodes.

17 Claims, 8 Drawing Sheets

(56) References Cited

U.S. PATENT DOCUMENTS

| | | |
|---|---|---|
| 8,869,542 B2 | 10/2014 | Zhang et al. |
| 9,109,818 B2 | 8/2015 | Schwartz et al. |
| 9,310,109 B2 | 4/2016 | Kruglick |
| 9,671,140 B2 | 6/2017 | Kruglick |
| 9,696,065 B2 | 7/2017 | Lonzarich et al. |
| 10,107,527 B2 * | 10/2018 | Radcliff ................. F25B 25/00 |
| 2004/0182086 A1 | 9/2004 | Chiang et al. |
| 2010/0175392 A1 | 7/2010 | Malloy et al. |
| 2015/0033762 A1 | 2/2015 | Cheng et al. |
| 2016/0187034 A1 | 6/2016 | Malic et al. |
| 2017/0030611 A1 | 2/2017 | Radcliff et al. |

FOREIGN PATENT DOCUMENTS

| | | |
|---|---|---|
| WO | 2017040625 A1 | 3/2017 |
| WO | 2017111916 A1 | 6/2017 |
| WO | 2017111918 A1 | 6/2017 |
| WO | 2017111919 A1 | 6/2017 |
| WO | 2019108299 A1 | 6/2019 |

OTHER PUBLICATIONS

Written Opinion for International Application No. PCT/US2018/053499; Application Filign Date Sep. 28, 2018; dated Jan. 17, 2019, 8 pages.

* cited by examiner

ELECTROCALORIC HEAT TRANSFER SYSTEM

CROSS REFERENCE TO RELATED APPLICATIONS

This application is a National Stage application of PCT/US2018/053499 filed Sep. 28, 2018, which claims the benefit of U.S. Provisional Application No. 62/592,837, filed Nov. 30, 2017, both of which are incorporated by reference in their entirety herein.

STATEMENT OF FEDERAL SUPPORT

This invention was made with Government support under Contract No. DE-EE0007044 awarded by U.S. Department of Energy. The Government has certain rights in the invention.

BACKGROUND

A wide variety of technologies exist for cooling applications, including but not limited to evaporative cooling, convective cooling, or solid state cooling such as electrothermic cooling. One of the most prevalent technologies in use for residential and commercial refrigeration and air conditioning is the vapor compression refrigerant heat transfer loop. These loops typically circulate a refrigerant having appropriate thermodynamic properties through a loop that includes a compressor, a heat rejection heat exchanger (i.e., heat exchanger condenser), an expansion device and a heat absorption heat exchanger (i.e., heat exchanger evaporator). Vapor compression refrigerant loops effectively provide cooling and refrigeration in a variety of settings, and in some situations can be run in reverse as a heat pump. However, many of the refrigerants can present environmental hazards such as ozone depleting potential (ODP) or global warming potential (GWP), or can be toxic or flammable. Additionally, vapor compression refrigerant loops can be impractical or disadvantageous in environments lacking a ready source of power sufficient to drive the mechanical compressor in the refrigerant loop. For example, in an electric vehicle, the power demand of an air conditioning compressor can result in a significantly shortened vehicle battery life or driving range. Similarly, the weight and power requirements of the compressor can be problematic in various portable cooling applications.

Accordingly, there has been interest in developing cooling technologies as alternatives to vapor compression refrigerant loops. Various technologies have been proposed such as field-active heat or electric current-responsive heat transfer systems relying on materials such as electrocaloric materials, magnetocaloric materials, or thermoelectric materials. However, many proposals have been configured as bench-scale demonstrations with limited capabilities.

BRIEF DESCRIPTION

Disclosed is a heat transfer system including a module. The module includes a peripheral frame and an electrocaloric element disposed in an opening in the peripheral frame. The electrocaloric element includes an electrocaloric film, a first electrode on a first side of the electrocaloric film, and a second electrode on a second side of the electrocaloric film. A first electrically conductive element electrically is connected to the first electrode, and is disposed adjacent to a first surface of the peripheral frame extending from the electrocaloric film toward the peripheral frame perimeter. A second electrically conductive element is electrically connected to the second electrode, and is disposed adjacent to a second surface of the peripheral frame extending from the electrocaloric film toward the peripheral frame perimeter. The module is connected a first electrical connection to electrical circuit(s) at first and second connections. The first electrical connection is disposed along the peripheral frame perimeter proximate to the peripheral frame first surface, connecting the first electrically conductive element to an electrical circuit. A second connection to an electrical circuit is disposed along the peripheral frame perimeter proximate to the peripheral frame second surface, connecting the second electrically conductive element to an electrical circuit. A working fluid flow path is disposed through the stack, including an inlet, an outlet, and a flow path along at least one surface of the of the electrocaloric element.

In some embodiments, the module further comprises a support extending parallel to the electrocaloric film in the peripheral frame opening.

In some embodiments, the support is permeable to the working fluid.

In any one or combination of the foregoing embodiments, either or both of the first and second surfaces include an outward-facing surface of the peripheral frame.

In any one or combination of the foregoing embodiments, either or both of the first and second surfaces include an inward-facing surface of the peripheral frame.

In any one or combination of the foregoing embodiments, the system further includes an alignment feature between the peripheral frame and the electrocaloric element.

In any one or combination of the foregoing embodiments, the system further includes a retention feature between the peripheral frame and the electrocaloric element.

In any one or combination of the foregoing embodiments, the system further includes an alignment feature between the peripheral frame and either or both of the first and second electrically conductive elements.

In any one or combination of the foregoing embodiments, the system further includes a retention feature between the peripheral frame and either or both of the first and second electrically conductive elements.

In any one or combination of the foregoing embodiments, either or both of the first and second electrically conductive elements comprise an electrically conductive layer or a wire along the respective first and second surfaces.

In any one or combination of the foregoing embodiments, either or both of the first and second electrically conductive elements include an electrical connector portion that extends outside of the peripheral frame perimeter.

In any one or combination of the foregoing embodiments, the system includes a plurality of said modules arranged in a stack.

In any one or combination of the foregoing embodiments, the plurality of electrocaloric elements are electrically connected in parallel, with the plurality of first electrical connections connected to a first electrical bus along a first portion of the stack proximate to the plurality of peripheral frame first surfaces, and the plurality of second electrical connections connected to a second electrical bus along a second portion of the stack proximate to the plurality of peripheral frame second surfaces.

In any one or combination of the foregoing embodiments, either or both of the first and second electrical buses comprise an electrically conductive bus element on a support.

In any one or combination of the foregoing embodiments, the peripheral frame includes a portion with a thickness configured to provide a space between adjacent electrocaloric elements in the stack.

In any one or combination of the foregoing embodiments, the stack includes a plurality of spacers between adjacent peripheral frames.

In any one or combination of the foregoing embodiments, the stack includes a plurality of spacers between adjacent electrocaloric elements.

In any one or combination of the foregoing embodiments, the supports of the plurality of electrocaloric modules separate adjacent electrocaloric films in the stack.

In any one or combination of the foregoing embodiments, the stack includes one or more alignment features between adjacent components in the stack.

In any one or combination of the foregoing embodiments, the stack includes one or more stack retention features.

In any one or combination of the foregoing embodiments, the electrocaloric elements in a stack are configured such that flow paths between adjacent electrocaloric elements are disposed between first electrodes of the adjacent electrocaloric elements or between second electrodes of the adjacent electrocaloric elements.

In some embodiments, a method of making the heat transfer system stack includes disposing a first electrocaloric element in the opening of a first peripheral frame, and attaching the electrocaloric element to the first peripheral frame. A first electrically conductive element is disposed adjacent to the first surface of the first peripheral frame, and electrically connected to the first electrode. A second electrically conductive element is disposed adjacent to the second surface of the first peripheral frame, and electrically connected to the second electrode. A second peripheral frame is stacked onto the first peripheral frame and the above steps are repeated to form the stack, and the first and second electrically conductive elements are connected to the first and second electrical buses, respectively.

Also disclosed is a method of making a heat transfer system in which an electrocaloric element comprising an electrocaloric film, a first electrode on a first side of the electrocaloric film, and a second electrode on a second side of the electrocaloric film is disposed in an opening of a first peripheral frame, and attached to the first peripheral frame. A first electrically conductive element is disposed adjacent to a first surface of the peripheral frame extending from the electrocaloric film toward the peripheral frame perimeter, and electrically connected to the first electrode. A second electrically conductive element is disposed adjacent to a second surface of the peripheral frame extending from the electrocaloric film toward the peripheral frame perimeter, and electrically connected to the second electrode. A second peripheral frame is stacked onto the first peripheral frame and the above steps are repeated to form a stack comprising a plurality of peripheral frames with electrocaloric elements, first and second electrically conductive elements, and a working fluid flow path through the stack comprising an inlet, an outlet, and a flow path between the inlet and the outlet through a plurality of spaces between adjacent electrocaloric elements. The first electrically conductive elements are connected in parallel to a first electrical bus or in series, and the second electrically conductive elements are connected in parallel to a second electrical bus or in series Also disclosed is a heat transfer system including a plurality of modules arranged in a stack, with the modules individually comprising a peripheral frame and an electrocaloric element comprising an electrocaloric film, a first electrode on a first side of the electrocaloric film, and a second electrode on a second side of the electrocaloric film disposed in an opening in the peripheral frame. A first electrical bus is electrically connected to the plurality of first electrically conductive elements, and a second electrical bus is electrically connected to the plurality of second electrically conductive elements. A working fluid flow path through the stack includes an inlet, an outlet, and a flow path between the inlet and the outlet through a plurality of spaces between adjacent electrocaloric elements in the stack. Either or both of the first and second electrical buses can comprise an electrically conductive bus element on a support

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 8:
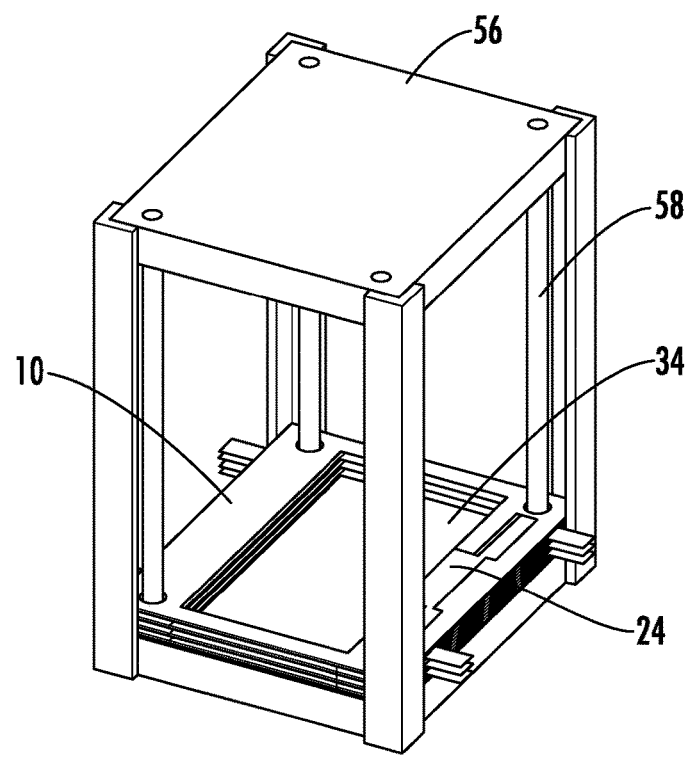
FIG. 8 schematically shows a perspective view of a partially assembled heat transfer system stack.

As mentioned above, a heat transfer system is disclosed that includes a functional module with a peripheral frame. Examples of peripheral frames 10 are shown in FIGS. 1A, 1B, 1C, and 1D. As shown in FIGS. 1A, 1B, 1C, and 1D, the peripheral frames 10 have an outer perimeter 12 and an inner perimeter 14, which surrounds a central opening 16. In some embodiments, the peripheral frame 10 can have slots 18 therein, which can go through the frame. The slots 18 can provide a pathway for and to help immobilize the electrically conductive elements 24 (see Figures below). In some embodiments, the peripheral frame 10 can include one or alignment or retention features. For example, through-passages such as holes 20 can be utilized to align the frames 10 and other modular components, and can also accommodate retention features such as stack assembly bolts 54 (FIG. 8). In some embodiments, rectangular peripheral frame 10 can include four or more alignment and/or retention features such as holes 20. Other types of alignment or retention features can be used by themselves or in combination, including but not limited to tabs, recesses, notches, interlocking features, external stack clamps or bands. In some embodiments, the peripheral frame can include one or more supports such as ribs 22 extending partly or completely across the opening 16, which can help provide support for electrocaloric elements 34 (FIGS. 4A-4C) to be disposed in the opening 16. The ribs 22 can extend in various directions, including parallel to fluid flow, perpendicular to fluid flow, other orientations to fluid flow, or non-linear. In some embodiments, the support can be in the form of a sheet such as a mesh or other porous sheet extending parallel to the plane of the electrocaloric film, and can occupy a footprint in that plane that is smaller than, the same as, or larger than the footprint of the electrocaloric film.

In some embodiments, the illustrated frames are rectangular in shape, which can provide convenient edge surfaces along the module(s) for connecting functional components such as fluid flow inlet/outlet or conduits, electrical connections, etc. However, any other shape can be used including but not limited to circular, ovular, rectangular, etc. In some embodiments, the peripheral frame can be electrically non-conductive. In some embodiments, the peripheral frame can be electrically conductive. The peripheral frame can be made of various materials, including but not limited to plastics (e.g., moldable thermoplastics such as polypropylene), ceramics, aerogels, cardboard, fiber composites, or metals.

Figure 1A:
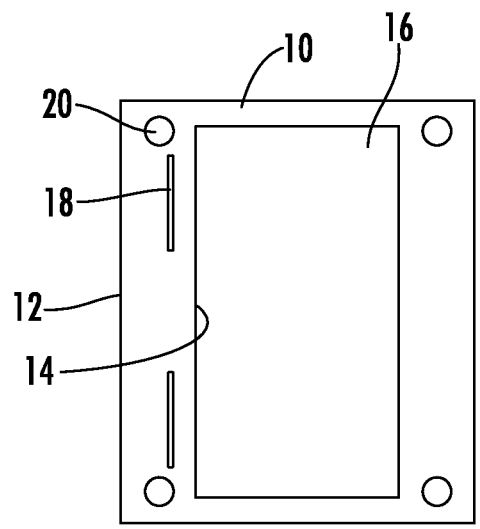
FIGS. 1A, 1B, 1C, and 1D each schematically shows an example embodiment of a peripheral frame component of a heat transfer system.
Figure 1B:
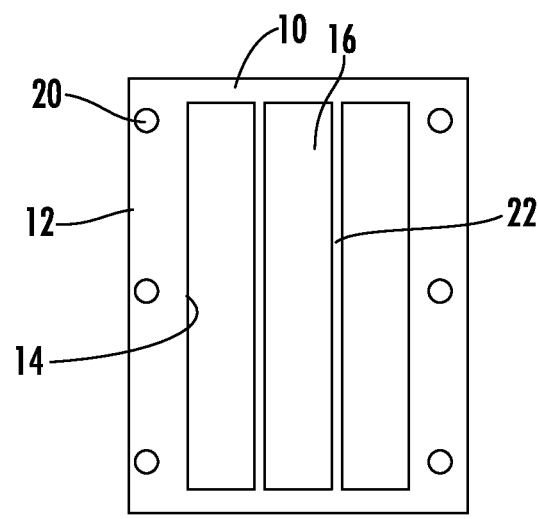
Figure 1C:
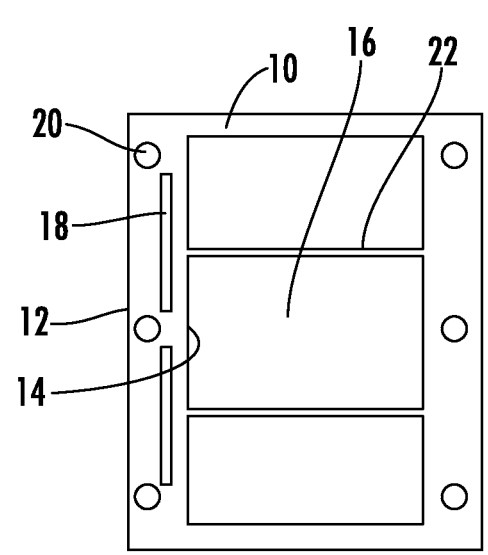
Figure 1D:
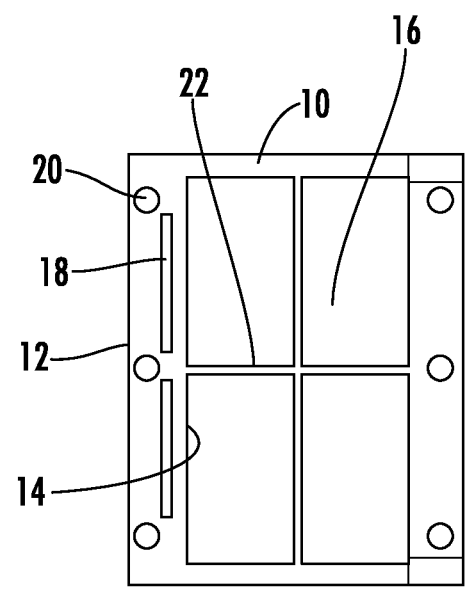
Figure 2A:
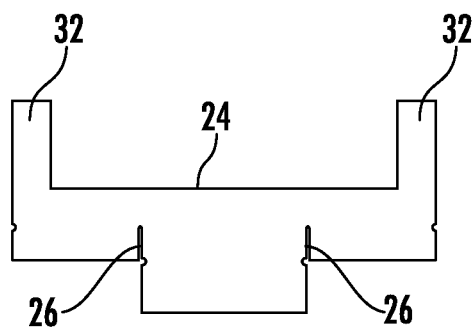
FIGS. 2A, 2B, and 2C each schematically shows an example embodiment of an electrically conductive element of a heat transfer system.
Figure 2B:
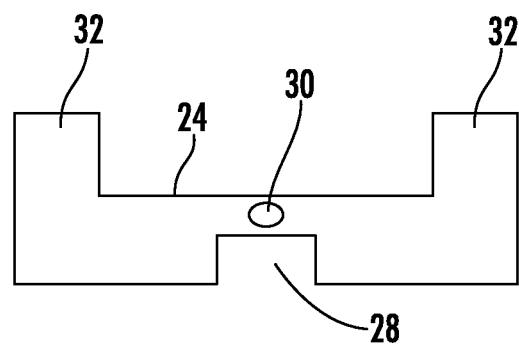
Figure 2C:
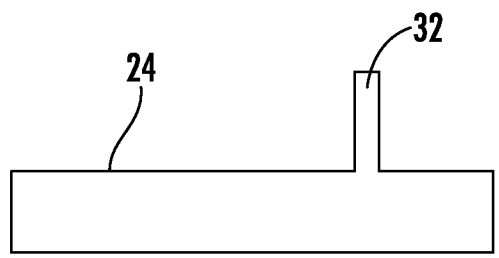

As mentioned above, the module includes first and second electrically conductive elements adjacent to first and second peripheral frame surfaces that provide an electrical connection to first and second electrodes on an electrocaloric element disposed in the peripheral frame opening 16. Example embodiments of electrically conductive elements 24 are schematically shown in FIGS. 2A, 2B, and 2C, and are shown integrated with peripheral frames 10 in FIGS. 3A, 3B, and 3C. The example embodiments illustrated can be formed from electrically conductive film or foil; however, other configurations can be used such as wires or a metal mesh. Various types of metallized surfaces such as vapor-deposited, thermal spray-deposited, or other metallized layers can be used as an alternative or in addition to an electrically conductive film or foil. Electrically conductive elements can also be formed using printed circuit board fabrication techniques, for example, electrically conductive vias. The peripheral frame surface(s) adjacent to the electrically conductive elements can be an outward-facing surface or an inward-facing surface. As used herein, "outward-facing surface" means any surface portion of the peripheral frame from which an imaginary line extending perpendicular to the peripheral frame surface would not intersect with the same peripheral frame. Also as used herein, "inward-facing surface" means any surface portion of the peripheral frame from which an imaginary line extending perpendicular to the peripheral frame surface would intersect with the same peripheral frame. Examples of inward-facing peripheral frame surfaces include channels, notches, slots, or conductive vias formed by printed circuit board fabrication techniques.

Figure 3A:
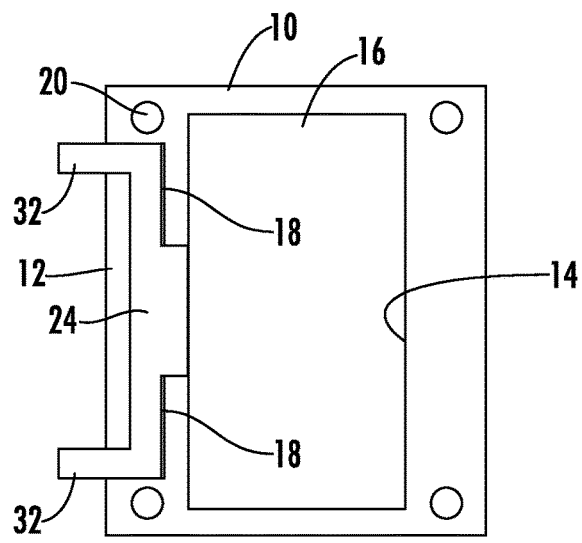
FIGS. 3A, 3B, and 3C each schematically shows an example embodiment of a peripheral frame of a heat transfer system integrated with an electrically conductive element.
Figure 3B:
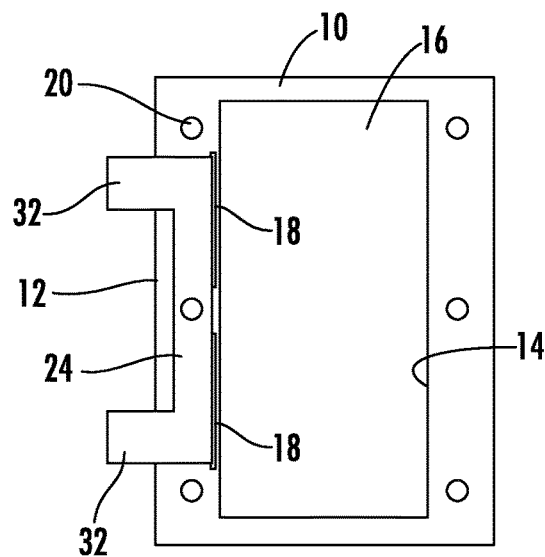
Figure 3C:
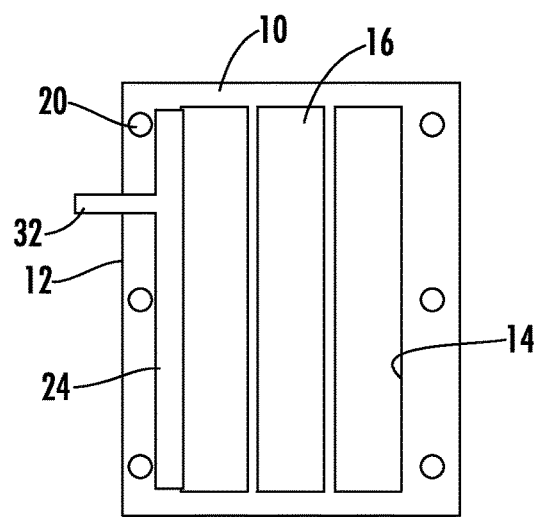
Figure 4A:
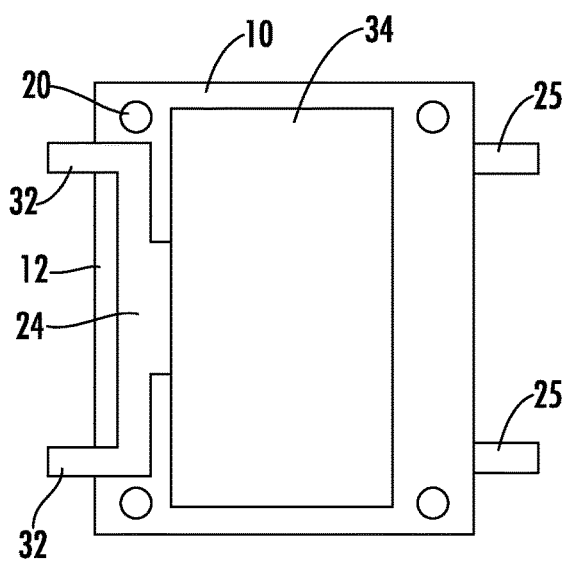
FIGS. 4A, 4B, and 4C each schematically shows an example embodiment of a peripheral frame of a heat transfer system integrated with an electrically conductive element and an electrocaloric element.
Figure 4B:
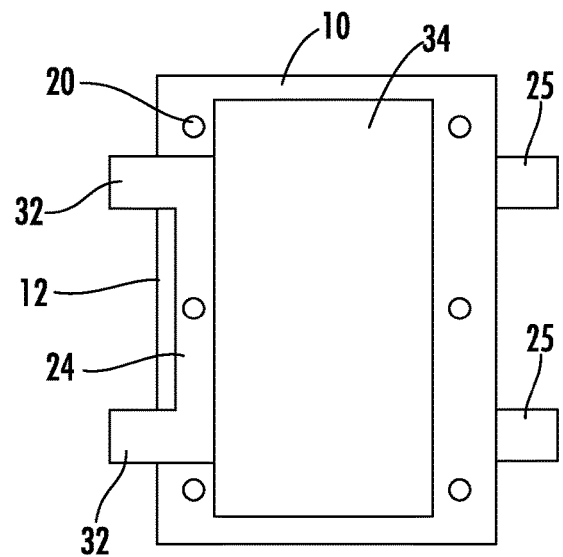
Figure 4C:
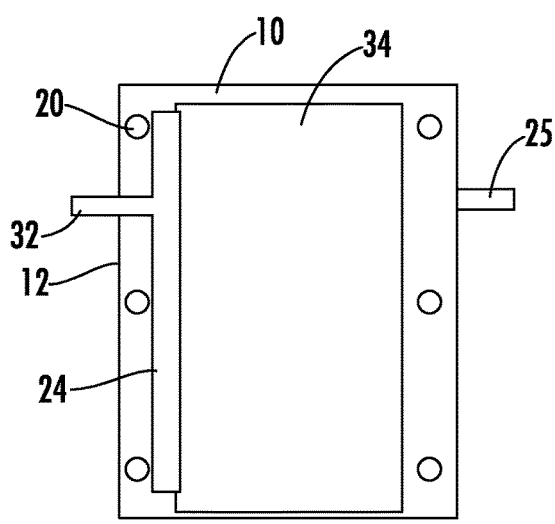

As shown in the Figures, in some embodiments, the electrically conductive element 24 can include a retention feature or alignment feature such as a film or foil with cut-outs 26 or 28, which can provide a technical effect of facilitating the alignment and folding of adjacent portions of the electrically conductive element around an edge or slot of the peripheral frame 10. FIGS. 3A and 3B show the electrically conductive elements 24 of FIGS. 2A and 2B disposed through the slots 18 of the peripheral frame 10, with a fold line at the position of the slot that is facilitated by the cut-outs 26 and 28 in the electrically conductive elements 24. Another type of alignment or retention feature for the electrically conductive element 24 can include a through-passage such as a hole 30, which can be aligned with a hole 20 of the peripheral frame 10 to accommodate a stack support structure. In some embodiments, the electrically conductive element 24 can include one or more extensions 32. In some embodiments, the extensions 32 can extend past the outer perimeter 12 of the peripheral frame 10 and can be used for electrical connections, e.g., to an electrical bus. FIGS. 4A, 4B, and 4C show example embodiments of integrated modules with peripheral frame 10, first and second electrically conductive elements 24 and 25 (with electrically conductive element 25 disposed on the opposite side of the frame as electrically conductive element 24), and electrocaloric element 34. In some embodiments, the module includes one or more alignment features and/or retention features between the electrocaloric element 34 and the peripheral frame 10. Such features include but are not limited to projections, holes, recesses, tabs, notches, crimping (of the electrocaloric element, or adhesive).

As mentioned above, the electrocaloric element 34 comprises an electrocaloric film with electrodes on opposite sides of the electrocaloric film. Examples of electrocaloric materials for the electrocaloric film can include but are not limited to inorganic (e.g., ceramics) or organic materials such as electrocaloric polymers, and polymer/ceramic composites. Composite materials such as organic polymers with inorganic fillers and/or fillers of a different organic polymer. In some embodiments, electrocaloric film thickness can be in a range having a lower limit of 0.1 µm, more specifically 0.5 µm, and even more specifically 1 µm. In some embodiments, the film thickness range can have an upper limit of 1000 µm, more specifically 100 µm, and even more specifically 10 µm. It is understood that these upper and lower range limits can be independently combined to disclose a number of different possible ranges.

Examples of inorganic electrocaloric materials include but are not limited to $PbTiO_3$ ("PT"), $Pb(Mg_{1/3}Nb_{2/3})O_3$ ("PMN"), PMN-PT, $LiTaO_3$, barium strontium titanate (BST) or PZT (lead, zirconium, titanium, oxygen). Examples of electrocaloric polymers include, but are not limited to ferroelectric polymers, liquid crystal polymers, and liquid crystal elastomers. Ferroelectric polymers are crystalline polymers, or polymers with a high degree of crystallinity, where the crystalline alignment of polymer chains into lamellae and/or spherulite structures can be modified by application of an electric field. Such characteristics can be provided by polar structures integrated into the polymer backbone or appended to the polymer backbone with a fixed orientation to the backbone. Examples of ferroelectric polymers include polyvinylidene fluoride (PVDF), polytriethylene fluoride, odd-numbered nylon, copolymers containing repeat units derived from vinylidene fluoride, and copolymers containing repeat units derived from triethylene fluoride. Polyvinylidene fluoride and copolymers containing repeat units derived from vinylidene fluoride have been widely studied for their ferroelectric and electrocaloric properties. Examples of vinylidene fluoride-containing copolymers include copolymers with methyl methacrylate, and copolymers with one or more halogenated co-monomers including but not limited to trifluoroethylene, tetrafluoroethylene, chlorotrifluoroethylene, trichloroethylene, vinylidene chloride, vinyl chloride, and other halogenated unsaturated monomers.

Liquid crystal polymers, or polymer liquid crystals comprise polymer molecules that include mesogenic groups. Mesogenic molecular structures are well-known, and are often described as rod-like or disk-like molecular structures having electron density orientations that produce a dipole moment in response to an external field such as an external electric field. Liquid crystal polymers typically comprise numerous mesogenic groups connected by non-mesogenic molecular structures. The non-mesogenic connecting structures and their connection, placement and spacing in the polymer molecule along with mesogenic structures are important in providing the fluid deformable response to the external field. Typically, the connecting structures provide stiffness low enough so that molecular realignment is induced by application of the external field, and high enough to provide the characteristics of a polymer when the external field is not applied. In some exemplary embodiments, a liquid crystal polymer can have rod-like mesogenic structures in the polymer backbone separated by non-mesogenic spacer groups having flexibility to allow for re-ordering of the mesogenic groups in response to an external field. Such polymers are also known as main-chain liquid crystal polymers. In some exemplary embodiments, a liquid crystal polymer can have rod-like mesogenic structures attached as side groups attached to the polymer backbone. Such polymers are also known as side-chain liquid crystal polymers. Electrodes on the electrocaloric film can take different forms with various electrically conductive components. In some embodiments, the electrodes can be in the form of metalized layers or patterns on each side of the film such as disclosed in published PCT application WO 2017/111921 A1 or U.S. patent application 62/521,080, the disclosures of each of which is incorporated herein by reference in its entirety.

Figure 5A:
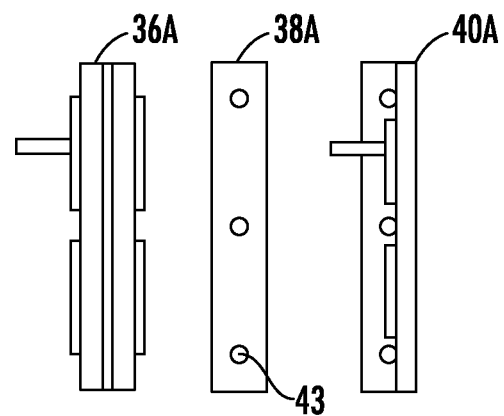
FIGS. 5A and 5B each schematically shows an example embodiment of a modular electrical bus component of a heat transfer system.
Figure 5B:
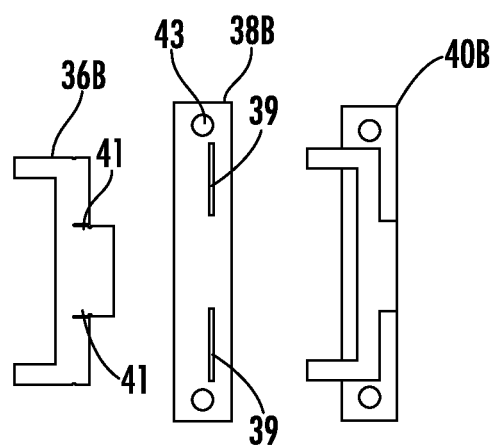

As mentioned above, in some embodiments, the heat transfer system includes a plurality of modules in a stack configuration. A stack of a plurality of modules will include a plurality of first and second electrically conductive elements 24/25 that are electrically connected to a plurality of first and second electrodes on a plurality of electrocaloric films disposed as electrocaloric elements 34 in a plurality of stacked peripheral frames 10. The first and second electrically conductive elements are also electrically connected in parallel on an electrical bus, also known as a bus bar, which are in turn connected to an electrical circuit or circuits (not shown) that can controllably energize the first and/or second electrode to subject the electrocaloric film to an electrical field. In some embodiments, a bus bar can be formed from an electrically conductive element such as conductive film or metal foil or other metallized layer on a base or support, which itself be electrically or electrically conductive or non-conductive. Example embodiments of bus structures are schematically shown in FIGS. 5A and 5B, with electrically conductive film or metal foil 36A/B disposed on base or support 38A/B to form the bus structures 40A/B. The base or support 38B is shown with slots 39 in FIG. 5B for immobilizing or the electrically conductive film or metal foil 36A/B, which can have cut-outs 41 to facilitate folding the film or foil at the slot-line. The base or support 38A/B (and optionally the electrically conductive film or metal foil 36A/B) can also include one or more through-passages such as holes 43 to facilitate stacking of the electrical bus structures with a stack assembly support such as a stack assembly bolt (which can be the same as or different than any stack support structures for the stacked modules). In some embodiments, the bus structures 40A/B can integrated with the stacked peripheral frames 10 (e.g., disposed between adjacent peripheral frames 10). In some embodiments, the bus structures 40A/B can be stacked independently proximate to the outer perimeter 12 of stacked peripheral frames 10.

As mentioned above, the stacked modules are configured to provide flow paths for a working fluid between adjacent electrocaloric elements 34. In some embodiments, the stack can include spacers between adjacent modules to provide space for such flow paths. In some embodiments, the spacers can be disposed between adjacent peripheral frames 10. Multiple spacers can be stacked together, optionally with different profiles to create 3D structures. Alternatively, or in addition to discrete spacers, portions of the peripheral frame can formed with a thickness (i.e., in a direction parallel with stack height) along the periphery of the peripheral frame 10 to provide space between adjacent electrocaloric elements. In some embodiments, spacers can be disposed in the area of opening 16 between adjacent electrocaloric elements 34, and can be integrated with the peripheral frame 10 such as shown for ribs 22 or can be discrete structures. In some embodiments, It should be noted that structures disposed in the fluid flow space (e.g., ribs 22 or discrete spacers) should be configured to allow for fluid flow. For example, such structures can be configured as strips disposed in a in a straight-line or non-straight-line longitudinal direction generally parallel to the direction of fluid flow, and/or can be formed from a fluid-permeable material such as a mesh or screen configuration. Additionally supports can be made from tensioned filament, strand, yarn, thread or other 1 dimensional materials that are wound around assembly bolts 58 (FIG. 8). In some embodiments, spacer structures disposed in the fluid flow space between adjacent electrocaloric films can be made of a flexible material or structure to accommodate displacement of the electrocaloric films during energization/de-energization cycling. In some embodiments, spacer structures disposed in the fluid flow space can be in the form of a mesh or other porous sheet parallel to the electrocaloric film, and can have a footprint in that plane that is smaller than, the same as, or larger than the footprint of the electrocaloric film. In some embodiments, spacer structures between electrocaloric element electrodes at the same voltage can be electrically conductive spacer structures, which can be fabricated using printed circuit board fabrication techniques and can serve both as spacer and as electrically conductive elements. In some embodiments, the spacer can be disposed as one or more mesh or screen spacers between adjacent electrocaloric films, which can in some embodiments be configured as a mat disposed in a plane parallel to the electrocaloric film.

Figure 6:
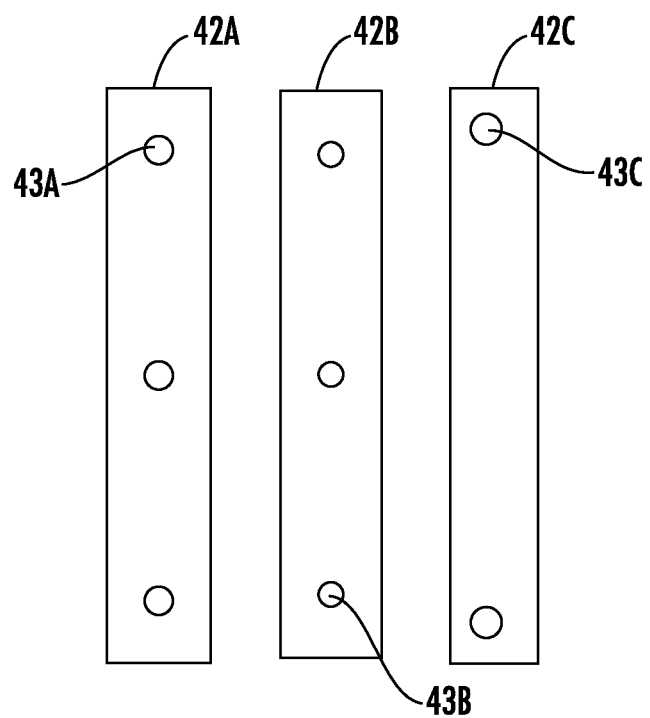
FIG. 6 schematically shows example embodiments of spacer components of a heat transfer system.

Example embodiments of discrete spacers 42A/B/C configured for stacking in between adjacent peripheral frames 10 are schematically shown in FIG. 6. As shown in FIG. 6, spacer 42A has holes 43A configured to align with the holes 20 of the peripheral frame 10 in FIGS. 1C and 1D, spacer 42B has holes 43B configured to align with the holes 20 of the peripheral frame 10 in FIG. 1B, and spacer 42C has holes 43C configured to align with the holes 20 of the peripheral frame 10 in FIG. 1A.

Figure 7:
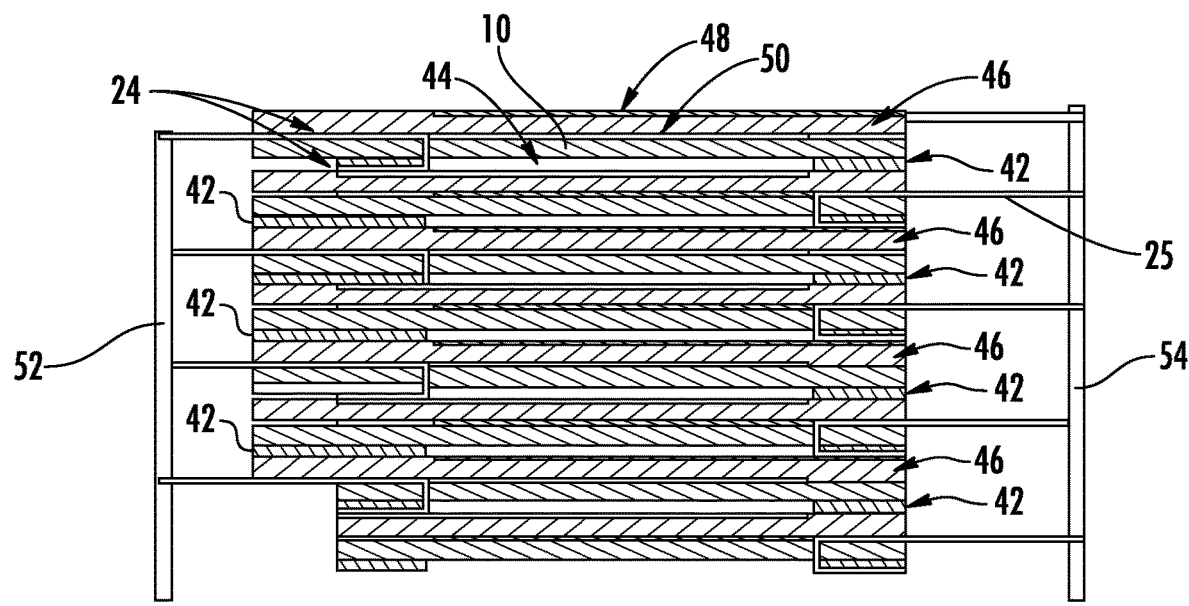
FIG. 7 schematically shows a cross-sectional view of an assembled heat transfer system stack.

Example embodiments of stacked modules are schematically shown in FIGS. 7 and 8. The order of assembly can be varied and adapted to achieve target specifications, and the order shown in FIG. 7 is a typical example including peripheral frames 10, spacers 42 electrocaloric elements having electrocaloric films 46 with first electrodes 48 and second electrodes 50, first and second electrically conductive elements 24, 25 electrically connected the first and second electrodes 48, 50 and to first and second electrical buses 52, 54, respectively. As shown in FIG. 7, the electrocaloric films are disposed in the stack with a configuration such that the relative (top/bottom) orientation of the first and second electrodes 48, 50 is alternated with adjacent films so that each fluid flow path 44 has electrodes of matching polarity on each side of the fluid flow path 44, which can prevent arcing across the flow path gap. The elements of FIG. 7 are arranged in a repeating stack; however, elements 10, 44, 48, and 50 are only labeled for the top course of the stack for clarity of illustration. FIG. 8 shows a perspective view of a partially assembled stack in a support structure 56 with stack assembly bolts 58 through holes in the peripheral frames 10.

Figure 9:
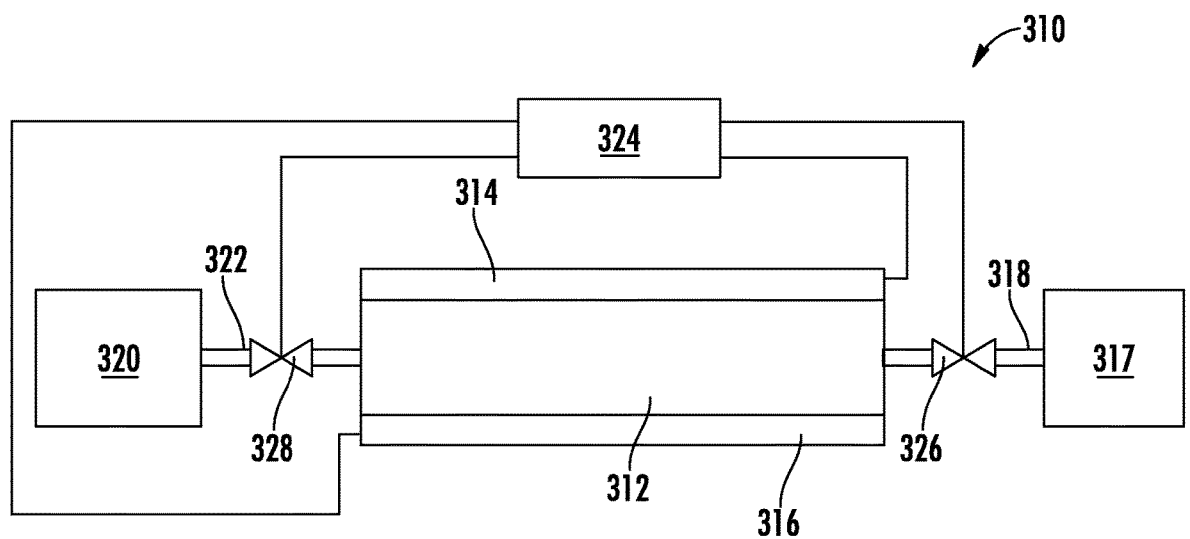
FIG. 9 is a schematic depiction of an example embodiment of an electrocaloric heat transfer system.

An example embodiment of a heat transfer system and its operation are further described with respect to FIG. 9. As shown in FIG. 9, a heat transfer system 310 comprises a stack 312 of modules with first and second electrical buses 314 and 316 in electrical communication with first and second electrodes on the electrocaloric films. The stack is in thermal communication with a heat sink 317 through a first thermal flow path 318, and in thermal communication with a heat source 320 through a second thermal flow path 322. The thermal flow paths are described below with respect thermal transfer through flow of working fluid through control devices 326 and 328 (e.g., flow dampers) between the stack and the heat sink and heat source. A controller 324 is configured to control electrical current to through a power source (not shown) to selectively activate the buses 314, 316. In some embodiments, the module can be energized by energizing one bus bar/electrode while maintaining the other bus bar/electrode at a ground polarity. The controller 324 is also configured to open and close control devices 326 and 328 to selectively direct the working fluid along the first and second flow paths 318 and 322.

In operation, the system 310 can be operated by the controller 324 applying an electric field as a voltage differential across the electrocaloric films in the stack to cause a decrease in entropy and a release of heat energy by the electrocaloric films. The controller 324 opens the control device 326 to transfer at least a portion of the released heat energy along flow path 318 to heat sink 317. This transfer of heat can occur after the temperature of the electrocaloric films has risen to a threshold temperature. In some embodiments, heat transfer to the heat sink 317 is begun as soon as the temperature of the electrocaloric films increases to be about equal to the temperature of the heat sink 317. After application of the electric field for a time to induce a desired release and transfer of heat energy from the electrocaloric films to the heat sink 317, the electric field can be removed. Removal of the electric field causes an increase in entropy and a decrease in heat energy of the electrocaloric films. This decrease in heat energy manifests as a reduction in temperature of the electrocaloric films to a temperature below that of the heat source 320. The controller 324 closes control device 326 to terminate flow along flow path 318, and opens control device 328 to transfer heat energy from the heat source 320 to the colder electrocaloric films in order to regenerate the electrocaloric films for another cycle.

In some embodiments, for example where a heat transfer system is utilized to maintain a temperature in a conditioned space or thermal target, the electric field can be applied to the electrocaloric films to increase temperature until the temperature reaches a first threshold. After the first temperature threshold, the controller 324 opens control device 326 to transfer heat from the stack to the heat sink 317 until a second temperature threshold is reached. The electric field can continue to be applied during all or a portion of the time period between the first and second temperature thresholds, and is then removed to reduce the temperature until a third temperature threshold is reached. The controller 324 then closes control device 326 to terminate heat flow transfer along heat flow path 318, and opens control device 328 to transfer heat from the heat source 320 to the stack. The above steps can be optionally repeated until a target temperature of the conditioned space or thermal target (which can be either the heat source or the heat sink) is reached.

Although any directions described herein (e.g., "up", "down", "top", "bottom", "left", "right", "over", "under", etc.) are considered to be arbitrary and to not have any absolute meaning but only a meaning relative to other directions. For convenience, unless otherwise indicated, the terms shall be relative to the view of the Figure shown on the page, i.e., "up" or "top" refers to the top of the page, "bottom" or "under" refers to the bottom of the page, "right" to the right-hand side of the page, and "left" to the left-hand side of the page.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A heat transfer system, comprising
   a module comprising a peripheral frame defining an opening and at least one support extending at least partly across the opening and arranged in a plane defined by the peripheral frame;
   an electrocaloric element disposed in an opening in the peripheral frame, said electrocaloric element comprising an electrocaloric film, a first electrode on a first side of the electrocaloric film, and a second electrode on a second side of the electrocaloric film;
   a first electrically conductive element electrically connected to the first electrode, said first electrically conductive element disposed adjacent to a first surface of the peripheral frame, said first surface extending from the electrocaloric film toward a perimeter of the peripheral frame; and a second electrically conductive element electrically connected to the second electrode, said second electrically conductive element disposed adjacent to a second surface of the peripheral frame, said second surface extending from the electrocaloric film toward the perimeter of the peripheral frame;

a first connection to an electrical circuit, said first connection disposed along the perimeter of the peripheral frame proximate to the peripheral frame first surface, and electrically connecting the first electrically conductive element to the electrical circuit;

a second connection to an electrical circuit, said second connection disposed along the perimeter of the peripheral frame proximate to the peripheral frame second surface, and electrically connecting the second electrically conductive element to the electrical circuit; and a working fluid flow path through the stack, comprising an inlet, an outlet, and a flow path along at least one surface of the of the electrocaloric element, wherein the at least one support is permeable to the working fluid.

2. The heat transfer system of claim 1, wherein either or both of the first and second surfaces include an outward-facing surface of the peripheral frame.

3. The heat transfer system of claim 1, wherein either or both of the first and second surfaces include an inward-facing surface of the peripheral frame.

4. The heat transfer system of claim 1, further comprising an alignment feature between the peripheral frame and the electrocaloric element.

5. The heat transfer system of claim 1, further comprising a retention feature between the peripheral frame and the electrocaloric element.

6. The heat transfer system of claim 1, further comprising an alignment feature between the peripheral frame and either or both of the first and second electrically conductive elements.

7. The heat transfer system of claim 1, further comprising a retention feature between the peripheral frame and either or both of the first and second electrically conductive elements.

8. The heat transfer system of claim 1, wherein either or both of the first and second electrically conductive elements comprise an electrically conductive layer or a wire along the respective first and second surfaces.

9. The heat transfer system of claim 1, wherein either or both of the first and second electrically conductive elements include an electrical connector portion that extends outside of the perimeter of the peripheral frame.

10. The heat transfer system of claim 1, comprising a plurality of said modules arranged in a stack.

11. The heat transfer system of claim 10, wherein a plurality of electrocaloric elements are electrically connected in parallel, with a plurality of first electrical connections connected to a first electrical bus along a first portion of the stack proximate to a plurality of peripheral frame first surfaces, and a plurality of second electrical connections connected to a second electrical bus along a second portion of the stack proximate to a plurality of peripheral frame second surfaces.

12. The heat transfer system of claim 11, wherein either or both of the first and second electrical buses comprise an electrically conductive bus element on a support.

13. The heat transfer system of claim 10, wherein the peripheral frame includes a portion with a thickness configured to provide a space between adjacent electrocaloric elements in the stack.

14. The heat transfer system of claim 10, further comprising a plurality of spacers between adjacent peripheral frames.

15. The heat transfer system of claim 10, further comprising a plurality of spacers between adjacent electrocaloric elements.

16. A method of making a heat transfer system, comprising (a) disposing an electrocaloric element in an opening of a first peripheral frame, and attaching the electrocaloric element to the first peripheral frame, the electrocaloric element comprising an electrocaloric film, a first electrode on a first side of the electrocaloric film, and a second electrode on a second side of the electrocaloric film and wherein the first peripheral frame comprises at least one support extending at least partly across the opening and arranged in a plane defined by the peripheral frame;

(b) disposing a first electrically conductive element adjacent to a first surface of the first peripheral frame extending from the electrocaloric film toward a perimeter of the first peripheral frame, and electrically connecting the first electrically conductive element to the first electrode;

(c) disposing a second electrically conductive element adjacent to a second surface of the peripheral frame extending from the electrocaloric film toward the perimeter of the peripheral frame, and electrically connecting the second electrically conductive element to the second electrode;

(d) stacking a second peripheral frame to the first peripheral frame and repeating steps (a)-(d) to form a stack comprising electrically a plurality of peripheral frames with electrocaloric elements, first and second electrically conductive elements, and a working fluid flow path through the stack comprising an inlet, an outlet, and a flow path between the inlet and the outlet through a plurality of spaces between adjacent electrocaloric elements;

(e) connecting the first electrically conductive elements in parallel to a first electrical bus or in series; and (f) connecting the second electrically conductive elements in parallel to a second electrical bus or in series, wherein the at least one support is permeable to the working fluid.

17. A heat transfer system, comprising a plurality of modules arranged in a stack, said modules individually comprising:

a peripheral frame defining an opening and at least one support extending at least partly across the opening and arranged in a plane defined by the peripheral frame;

an electrocaloric element disposed in an opening in the peripheral frame, said electrocaloric element comprising an electrocaloric film, a first electrode on a first side of the electrocaloric film, and a second electrode on a second side of the electrocaloric film;

a first electrical bus electrically connected to a plurality of first electrically conductive elements of the modules;

a second electrical bus electrically connected to a plurality of second electrically conductive elements of the modules; and a working fluid flow path through the stack, comprising an inlet, an outlet, and a flow path between the inlet and the outlet through a plurality of spaces between adjacent electrocaloric elements, wherein either or both of the first and second electrical buses comprise an electrically conductive bus element on a support, and wherein the at least one support is permeable to the working fluid.

* * * * *